Feb. 2, 1932.   R. J. NORTON   1,843,622
CAPACITOR
Filed May 22, 1930
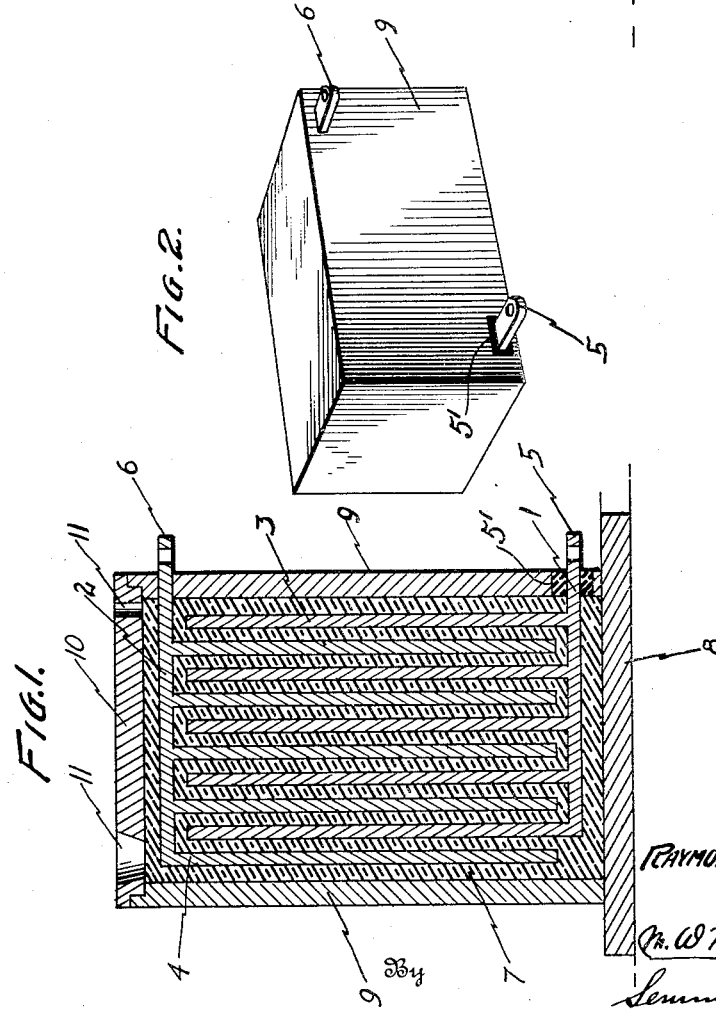
Inventor
RAYMOND J. NORTON Patented Feb. 2, 1932

1,843,622

UNITED STATES PATENT OFFICE

RAYMOND J. NORTON, OF WASHINGTON, DISTRICT OF COLUMBIA, ASSIGNOR TO BENDIX AVIATION CORPORATION, OF SOUTH BEND, INDIANA, A CORPORATION OF DELAWARE

CAPACITOR

Application filed May 22, 1930. Serial No. 454,755.

This invention relates to electrostatic condensers and more particularly to a power condenser.

A desideratum in condenser structure is a uniform pressure upon the elements in the stack. This has been attempted to be secured by placing the stack under initial mechanical pressure and interposing in the stack structure a resilient member. When the condenser is subjected to any great range of temperatures the metallic armatures and the interleaved dielectrics tend to expand differentially thereby tending to pull apart and vary the pressure.

It is an object of the present invention to provide a novel condenser of light weight materials and of a highly uniform expansion.

Another object is to provide a power condenser having a high heat dissipation factor.

Yet another object is to provide a condenser structure of light weight materials particularly suitable for airplane use.

With these and other equally important objects in view the invention comprehends the provision of a condenser comprising dielectric material and metallic armatures which are constructed of a high strength alloy having a desirable coefficient of expansion, coefficient of conductivity and tensile strength. In the preferred modification these armatures may comprise certain aluminum or magnesium alloys which are so chosen as to present a coefficient of thermal expansion very closely approximating that of the dielectric material. Further refinements of the invention include the provision of a conductive path from the stack to the exterior and the use of a heat dissipative surface having a high degree of heat emissivity.

In order to clarify an understanding of the invention, preferred embodiments of it are shown in the accompanying drawings of which:

Figure 1 is a cross section of a condenser stack,

Figure 2 is a perspective view of the complete condenser, and

Figure 3 is a sectional view of a modified form of the condenser.

In accordance with the present invention a condenser is provided which comprises essentially a composite metallo-resin, that is to say, metal members about which are moulded dielectric resins having substantially the same coefficient of thermal expansion as the metal.

The metal and resin parts of the structure are so chosen as to present substantially the same coefficient of expansion. This fact restricts the choice of materials considerably because of the wide discrepancy between coefficients of expansion of the synthetic resins and the typical metals. This fact is indicated in the following table giving the coefficients of expansion of typical resins and typical metals:

Table I

| Material | Thermal expansion between 20 to 60° C. |
|---|---|
| Laminated phenolic insulating material | 20 x 10⁻⁶ |
| Molded phenolic insulating material | 25 to 45 x 10⁻⁶ |
| Steel | 15 x 10⁻⁶ |
| Annealed steel | 10 x 10⁻⁶ |
| Copper | 15 x 10⁻⁶ |
| Nickel steel (10% nickel) | 13 x 10⁻⁶ |
| Invar steel (36% nickel) | .9 x 10⁻⁶ |

It will be observed from the preceding table that the coefficients of expansion of the resins are quite high and that if these were used with the ordinary metals there would be a decided tendency for the two elements to separate or pull apart.

However, if there is combined with the resin a metallic member which has substantially the same coefficient of expansion a useful composite condenser structure may be secured. Certain metal alloys fulfill this requirement and in addition present other advantages. The aluminum-copper-magnesium-silicon alloy, known as dural, and the magnesium-aluminum-manganese alloys have a desirably high coefficient of thermal expansion which closely approximates a coefficient of expansion of the synthetic resins.

This approximation is shown in the following table:

Table II

| Material | Average coefficient |
|---|---|
| Bakelite dilecto between 20 and 60° C. | 22 x 10⁻⁶ |
| Continental bakelite (C. B. grade) between 25 and 60° C. | 31 x 10⁻⁶ |
| Duralumin (sand cast) from 20 to 100° C. | 23.4 x 10⁻⁶ |
| Duralumin (sand cast) between 20 to 250° C. | 25.7 x 10⁻⁶ |
| Mg 95.56—Al 4.44 between 20° and 100° C. | 26.4 x 10⁻⁶ |
| Mg 93.78—Al 6.22 between 20° and 100° C. | 26.4 x 10⁻⁶ |
| Mg 89.96—Al 10.04 between 20° and 100° C. | 26 x 10⁻⁶ |
| Mg 95.59—Al 4.14—Mn .27 between 20° and 100° C. | 26.6 x 10⁻⁶ |
| Mg 99.08—Al .01—Mn .91 between 20° and 100° C. | 26.3 x 10⁻⁶ |

These materials besides having a desirable coefficient of expansion have a very high ratio of strength to weight. Furthermore these alloys have a high coefficient of heat conductivity and compare most favorably in this respect to the usual type of armature structure. Whereas tin, at 18° C. has a coefficient of thermal conductivity of .155, aluminum has a coefficient of approximately .4. The metal magnesium and its alloys likewise have a characteristically high thermal conductivity.

Another advantage of the alloy dural lies in the fact that it may be coated with pure aluminum and cemented at the surface interface. The exterior or exposed surface of pure aluminum may be oxidized to form a heat dissipative section of high emissivity. As is known, aluminum oxide approximates lamp black in this factor.

These novel features may be embodied in a power condenser to secure the described advantages. As shown in Figure 1, such a condenser may comprise a metallic armature 1 of a certain polarity and a cooperating armature 2 of opposite polarity. Each armature is preferably made up with a series of laterally extending plates, 3 and 4 respectively. As shown in the drawings the plates are made integral with the main conductors each of which extend beyond the surface of the casing and are apertured so as to provide the terminals 5 and 6.

The armatures of the two separate metallic elements are so spaced as to be mounted in alternate relationship as clearly shown in Figure 1. Interposed between the respectively adjacent plates 3 and 4 is a dielectric material 7 of the character described; that is to say, a synthetic resin having a coefficient of expansion approximating that of the metallic armatures. The interleaved metallic armatures and dielectrics may first be made up as a composite member and then inserted in a suitable casing. To do this the metal members are placed in a suitable form and the resin, in the fusible state, forced in under pressure. By subjecting the fusible form of the resin to elevated temperature and pressure it may be transformed to the infusible form. The composite metallo-resin unit may be enclosed in a dielectric or insulating container or in a metal container. In accordance with the principles hereinbefore described the metal container may comprise dural members which are coated with aluminum, the exposed surface of which is oxidized. This structure, as will be appreciated, insures effective heat dissipation.

If desired the armatures may be permanently and directly associated with the dielectric material and the casing in the one operation. To do this a casing comprising the base 8, side walls 9, and top 10, is provided. These faces of the casing may be made up as separate members and then suitably fastened together. One of the walls 9 is apertured to provide for the protrusion of the terminals 5 and 6. In assembling the unit the armature members 1 and 2 are suitably positioned within the casing so that the plates 3 and 4 are respectively adjacent and spaced and the terminals 5 and 6 extend beyond the exterior of the casing. Bushing 5' insulates terminal 5 from the adjacent plate 9. The plate at 10 may be provided with fill holes 11 into which is introduced the dielectric material. This may be forced in under pressure so that it completely incloses the metallic elements within the container and exerts a uniform pressure thereon. After the fusible form of the resin has been admitted the member may be subjected to the proper pressure and temperature conditions to transform it to an infusible form.

If desired also a composite unit comprising metal armatures about which have been moulded a synthetic resin dielectric may first be made up and then placed in the casing. The casing may then be filled with a suitable dielectric of other characteristics such as wax so as to provide the proper embedment for the stack. In any case the fill holes 11 are sealed after the casing has been filled.

As indicated in Figure 3 other modifications of the invention may be made. The armature plate of dural or a suitable magnesium alloy might be constituted by the separate members 12 and 13. The armatures of one polarity are separated from each other by suitable spacers 14 and the armatures of opposite polarity by similar spacers 15. The several armatures are mounted in juxtaposed relationship and maintained in this relationship by the connecting bolts 16 and 17. Enclosing the armatures is the dielectric material 18 which may be moulded about the metal in the manner described. The stack is enclosed in the metal container 21 through one side of which project the bolts 16 and 17. These bolt projections, in the manner well understood, serve as terminals. Each bolt is suitably insulated from the casing by the insulated bushings 19 and 20. The casing may be made up of detachable sections which are secured together. One of the faces of the casing is provided with the fill hole 22 through which a dielectric material may be admitted. If the stack is first made up as a composite metallo-resin, it may thereafter be placed within the casing and in spaces therein filled up by a plastic embedment admitted through the fill hole 22. After the filling operation fill hole 22 may be sealed.

It will be appreciated that the containers made up in accordance with the present disclosure comprise associated metallic elements and dielectric material which will expand substantially uniformly under increases in temperature. Due to the metallic material employed any heat generated during the operation will be rapidly conducted to a radiating surface and quickly dissipated from this surface. Due to the desirable specific gravity of the metallic materials the complete condenser combines the advantages of light weight and high strength. The condenser is particularly suitable either for a power condenser or, in electrical installations, as in airplanes, where the weight factor is of importance.

While specific embodiments of the invention have been described it is understood that these are given merely as examples. Since the principle herein involved may be incorporated in other specific devices it is not intended to be limited to those shown and described except as such limitations are clearly imposed by the appended claims.

I claim:

1. A condenser stack comprising interleaved metallic armatures and dielectrics having substantially the same coefficient of thermal expansion.

2. A condenser stack comprising metallic armatures and a resin moulded about the armatures and having substantially the same coefficient of expansion.

3. A capacitor comprising metallic armatures having high coefficients of thermal expansion and conductivity and a dielectric material having substantially the same coefficient of expansion as the armatures.

4. A capacitor comprising metallic armatures having high coefficients of thermal expansion and conductivity and a synthetic resin moulded thereabout having substantially the same coefficient of expansion as the armatures moulded thereon.

5. A capacitor having dielectric material and metallic armatures of substantially the same coefficient of expansion and an exterior heat dissipating coating of a metallic oxide.

6. A capacitor having dielectric material and metallic armatures of substantially the same coefficient of expansion, and an exterior heat dissipating coating of aluminum oxide.

7. A capacitor having dielectric material and magnesium alloy armatures and an exterior coating of aluminum oxide.

In testimony whereof I affix my signature.

RAYMOND J. NORTON.